(12) United States Patent
Goel et al.

(10) Patent No.: US 8,972,750 B2
(45) Date of Patent: Mar. 3, 2015

(54) METHOD AND APPARATUS FOR SECURING TRANSFER OF SECURE CONTENT TO A DESTINATION

(71) Applicant: Adobe Systems Inc., San Jose, CA (US)

(72) Inventors: Naveen Prakash Goel, Noida (IN); Sachin Soni, New Dehli (IN); Abhishek Kumar, New Dehli (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/719,925

(22) Filed: Dec. 19, 2012

(65) Prior Publication Data

US 2014/0173295 A1    Jun. 19, 2014

(51) Int. Cl.
| | |
|---|---|
| *G06F 21/00* | (2013.01) |
| *G06F 21/60* | (2013.01) |
| *H04L 9/08* | (2006.01) |
| *G06F 21/10* | (2013.01) |

(52) U.S. Cl.
CPC ............ *G06F 21/602* (2013.01); *H04L 9/08* (2013.01); *G06F 21/10* (2013.01)
USPC ....................................................... 713/193

(58) Field of Classification Search
CPC .......... H04L 9/08; G06F 21/10; G06F 21/602
USPC ....................................................... 713/193
See application file for complete search history.

(56) References Cited

U.S. PATENT DOCUMENTS

| | | | |
|---|---|---|---|
| 7,281,272 B1 | 10/2007 | Rubin et al. | |
| 7,950,066 B1 * | 5/2011 | Zuili ................................ | 726/33 |
| 8,141,159 B2 | 3/2012 | Peled et al. | |
| 2003/0131353 A1 * | 7/2003 | Blom et al. ...................... | 725/25 |
| 2004/0255147 A1 * | 12/2004 | Peled et al. ..................... | 713/200 |
| 2007/0016771 A1 * | 1/2007 | Allison et al. ................. | 713/165 |
| 2009/0097655 A1 * | 4/2009 | Kishimoto et al. ........... | 380/277 |
| 2010/0275273 A1 | 10/2010 | Liu et al. | |
| 2012/0016907 A1 * | 1/2012 | Ikeda et al. .................... | 707/783 |
| 2012/0226913 A1 * | 9/2012 | Park et al. ...................... | 713/189 |
| 2012/0255018 A1 * | 10/2012 | Sallam ............................ | 726/24 |
| 2013/0304815 A1 * | 11/2013 | Puente et al. .................. | 709/204 |

FOREIGN PATENT DOCUMENTS

KR             201000621    *    5/2010 ..................... 713/189

OTHER PUBLICATIONS

David B. Hill, MD, "Getting a Lock on Patient Confidentiality With E-Mail Encryption," Family Practice Management, Oct. 7, 2000, 5 pages.

* cited by examiner

*Primary Examiner* — Hadi Armouche
*Assistant Examiner* — Shahriar Zarrineh
(74) *Attorney, Agent, or Firm* — Keller Jolley Preece

(57) ABSTRACT

A computer implemented method and apparatus for securing transfer of secure content to a destination. The method comprises receiving a request to copy selected content from a secure source document; extracting one or more security settings associated with at least one of the selected content or the source document; encrypting the selected content with the one or more extracted security settings; and storing the encrypted content and the one or more extracted security settings.

13 Claims, 4 Drawing Sheets

METHOD AND APPARATUS FOR SECURING TRANSFER OF SECURE CONTENT TO A DESTINATION

BACKGROUND OF THE INVENTION

1. Field of the Invention

Embodiments of the present invention generally relate to electronic document security and, more particularly, to a method and apparatus for securing transfer of secure content to a destination.

2. Description of the Related Art

In the Internet age, it is imperative to safeguard information from unauthorized viewers. However, encryption is not a guarantee that secure content is safe. Even with the plethora of security measures available, secure content is often accidentally transferred to non-secure or less secure destinations. Users accidentally fail to comprehend the dilution of security that is facilitated when information present within a confidential document is transited to an unsecure document or application. For example, a user may enter a password in order to open a secure source document, thereby authenticating the user. The user may then copy some content from the source document and paste it to another, less secure document. Two problems have occurred. First, the secure source content that had certain rights/security applied to it has gone to a clipboard used for temporary storage before initiating the paste, without any security. It is possible for malicious browser scripts to steal plain-text information present on the clipboard. Second, when the user pastes the content into a destination document, the destination document may have no security or less security than the source document.

A similar situation occurs when a user opens a secure document and chooses to export it to a different format, or perform a "local save as". The content, which had certain rights/security applied to it, has gone to a destination that may not have any (or may have different) rights/security mechanisms associated with it.

Therefore, there is a need for a method and apparatus for securing transfer of secure content to a destination.

SUMMARY OF THE INVENTION

A method and apparatus for securing transfer of secure content to a destination substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
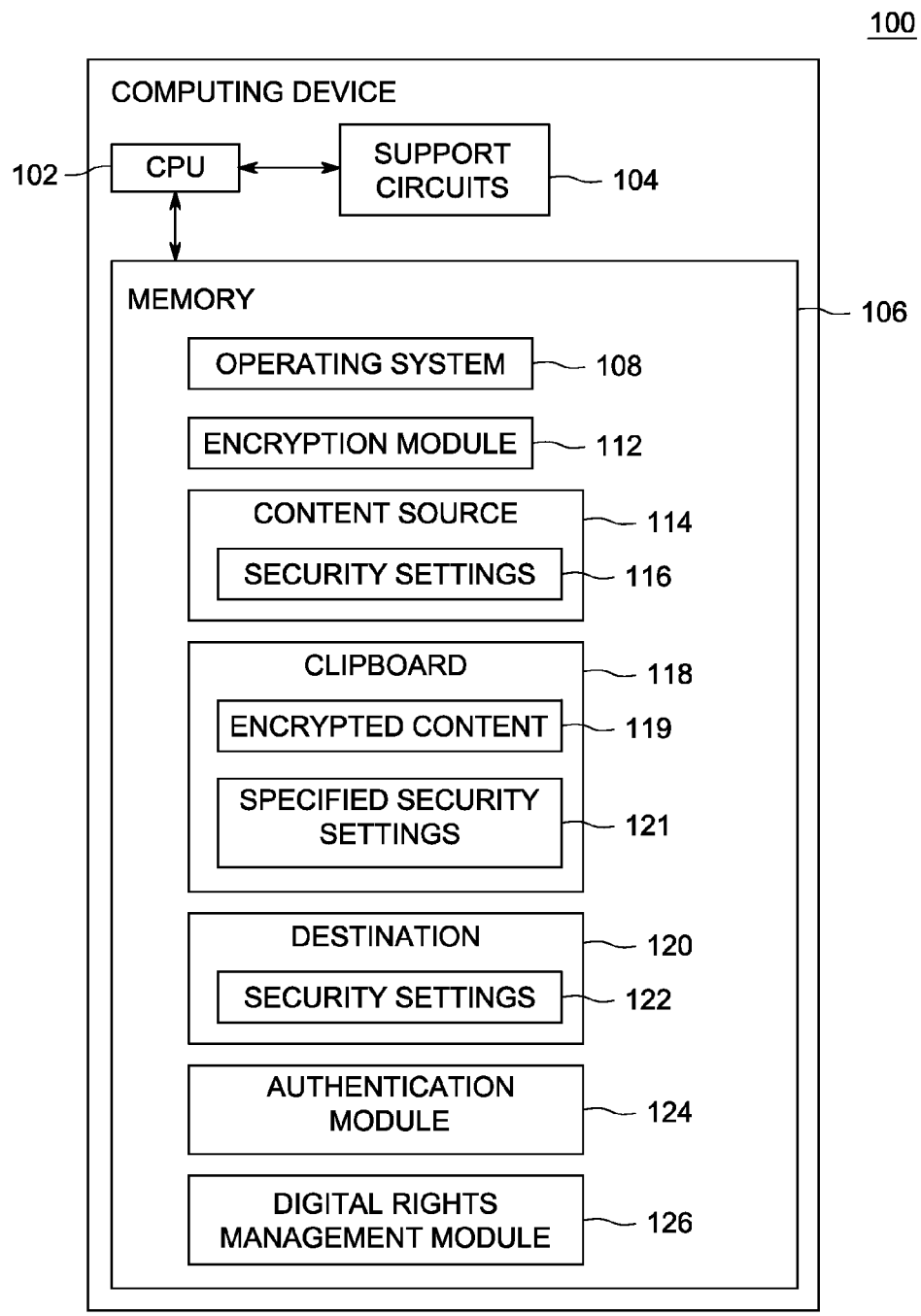
FIG. 1 is a block diagram of a computing device for securing transfer of secure content to a destination, according to one or more embodiments.

While the method and apparatus is described herein by way of example for several embodiments and illustrative drawings, those skilled in the art will recognize that the method and apparatus for securing transfer of secure content to a destination is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for securing transfer of secure content to a destination defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for securing transfer of secure content to a destination. When a user copies content from a secured source document, the method extracts the security settings of the secured source document. Before placing the content on a clipboard or other short-term storage location, such as an internal memory for temporary storage, the method encrypts the content using the extracted security settings and stores the extracted security settings and the encrypted content on the clipboard in a secure format. In some embodiments, options may be provided to enable the selection of which, if any, extracted security settings are applied to the selected content. For example, the selection may be done in response to an input received from a user. Further, options may be provided that enable the selection of additional security setting or specify security settings based on the destination file format. These selections may also be done, for example, in response to an input received from a user. All specified security settings are stored on the clipboard with the encrypted content. When a user attempts to paste the secure content to a destination, the method extracts the security settings from the clipboard and the user is authenticated before the content is released from the clipboard. If the user cannot be authenticated, the content is not released from the clipboard. Upon successful authentication, the method determines whether any security settings exist for the destination document and if so, the method merges the security settings of the of the source document with the security of the destination document and applies the merged security setting to the destination document. If the destination document does not contain any security settings, the destination document inherits the security settings of the source document.

Similarly, if a secure document is saved locally or in a new format, the newly created document inherits the security settings of the source document and/or any additional security settings specified by the user. It is noted that the term "destination" as used herein includes storage of a file or document as part of a temporary process, such as storage in a clipboard as part of a "cut and paste" operation, as well as more long-term file or document storage such as on a hard drive or fixed media, that result from operations such as "save as", "save to" or "convert to", and the like. As used hereinafter, the word "document" includes any type of electronic file, such as a document, database or executable file.

Various embodiments of a method and apparatus for securing transfer of secure content to a destination are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a computing device 100 for securing transfer of secure content to a destination, according to one or more embodiments. The computing device 100 comprises a Central Processing Unit (or CPU) 102, support circuits 104, and a memory 106. The CPU 102 may comprise one or more commercially available microprocessors or microcontrollers that facilitate data processing and storage. The various support circuits 104 facilitate the operation of the CPU 102 and include one or more clock circuits, power supplies, cache, input/output circuits, and the like. The memory 106 comprises at least one of Read Only Memory (ROM), Random Access Memory (RAM), disk drive storage, optical storage, removable storage and/or the like.

The memory 106 comprises an operating system 108, an encryption module 112, a content source 114, a clipboard 118, a destination 120, an authentication module, 124, and a digital rights management module 126. The content source 114 comprises one or more security settings 116. The destination 120 may comprise one or more security settings 122. Security settings 122 include authentication information, encryption mechanisms, permissions, and the like. The content source 114 and the destination 120 may be any type of digital file, such as a portable document format (PDF) file created with ADOBE® ACROBAT®, a MICROSOFT® OFFICE® document such as created by WORD® or EXCEL®, or any digital file created using a software application. The digital rights management module 126 may be any rights management software capable of creating and setting policies that limit users' access and privileges to a document, such as ADOBE® LIVECYCLE® Rights Management ES3 module.

When a user selects content to copy from a secure content source 114, the encryption module 112 extracts the security settings 116 from the content source 114. The user may specify which, if any, of the extracted security settings 116, the user would like to applied to the selected content. The user may also specify additional security settings to be applied to the selected content. The encryption module 112 then encrypts the selected content based on the specified security settings 121 and stores the encrypted content 119 in a secure format on the clipboard 118. The specified security settings 121 are also stored on the clipboard 118 along with the encrypted content 119. Upon receiving a request to "paste" the encrypted content 119, the authentication module 124 uses the specified security settings 121 to authenticate the user who is requesting the "paste". If the user cannot be authenticated, the encrypted content 119 may not be used. Upon successful authentication, the encryption module 112 decrypts the encrypted content 119. The encryption module 112 extracts the security settings 122 from the destination 120 and determines the combined security settings from both the source and the destination to use to encrypt the decrypted content at the destination 120. For example, if the content source 114 uses password encryption with copy permissions, and the destination 120 uses certificate-based encryption with print, copy and edit permissions, the destination 120 content is encrypted with new security settings 122 comprising the certificate-based encryption of the content source 114 with copy permissions. Optionally, when the content source 114 and the destination 120 use a same encryption algorithm, particular parts of the destination content may be encrypted with different security settings. For example, if both the content source 114 and the destination 120 use password encryption, wherein the content source 114 has copy permissions, and the destination 120 has print, copy, and edit permissions, the encryption algorithm remains password encryption, however, the content copied from the content source 114 has encryption parameters different from the remaining parts of the destination content. Specifically, the content copied from the content source 114 has copy permissions and the remainder of the content in the destination 120 has print, copy, and edit permissions.

Similarly, when a secured document, in whole or in part, is saved as a local copy or when the secured document is requested to be converted from a current format into a new format, the encryption module 110 extracts the security settings 116 from the content source 114 as described previously. A user may similarly specify which extracted security setting to use and/or apply additional security settings to the selected content. The encryption module 110 then encrypts the content at the destination 120, thereby applying the security settings 116 of the content source 114 as the security settings 122 of the destination 120.

Figure 2:
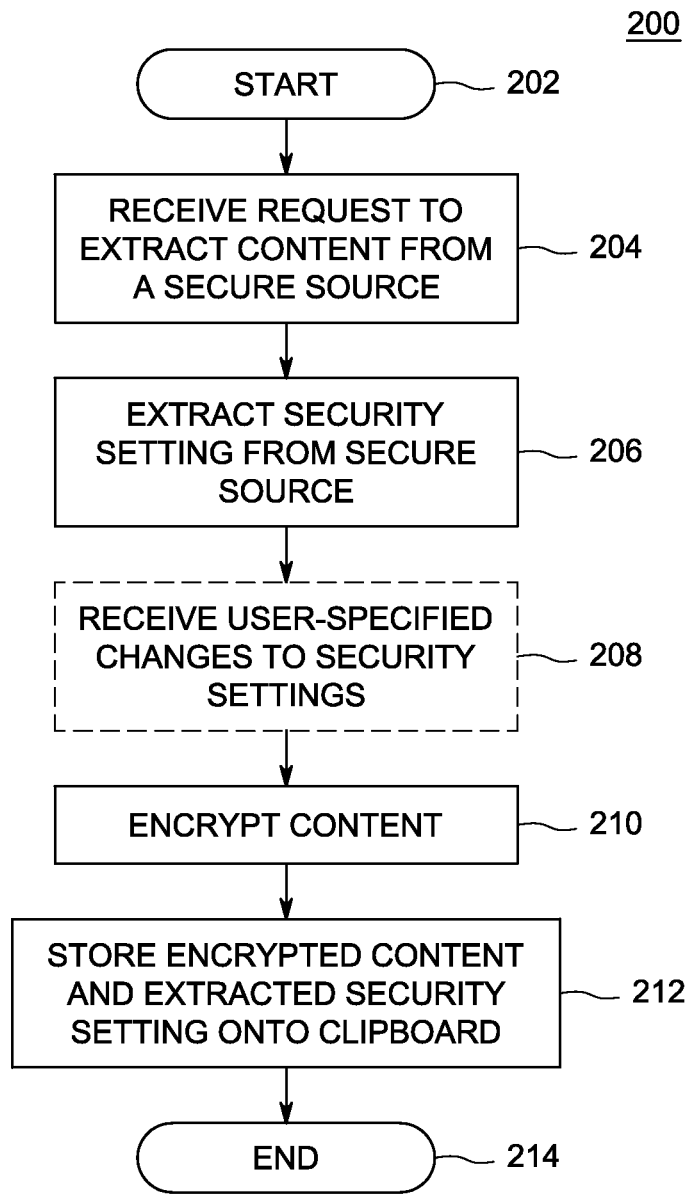
FIG. 2 is a flowchart of a method for extracting selected secure content from a content source and storing it on a clipboard as performed by the encryption module of FIG. 1, according to one or more embodiments.

FIG. 2 is a flowchart of a method 200 for extracting selected secure content from a content source and storing it on a clipboard as performed by the encryption module 112 of FIG. 1, according to one or more embodiments. The method 200 extracts the security settings from a secure content source, and encrypts the selected content using the extracted security settings before placing the encrypted content onto the clipboard.

The method 200 starts at step 202 and proceeds to step 204. At step 204, the method 200 receives a request to extract content from a secure content source. The request may be in the form of, for example, a copy request, a cut request (as part of a cut and paste request), and the like. The secure content source may be secured using one or more encryption methods. The content source may be secured with password encryption, certificate-based cryptography techniques, policy server encryption, or any encryption mechanism known in the art. Password encryption requires a user to enter a password in order to access a document. Using certificate-based encryption techniques, an electronic document uses a digital signature to bind a public key with an identity. The certificate is used to verify that a public key belongs to an individual. The certificate is issued by a certification authority, who guarantees the link between a physical identity and a cryptographic public key. Policy server encryption involves maintaining a database of user permissions that define different access policies and permissions for a given userID. For example, a user may have permission to read a document for a pre-defined period of time, (document expiry), but the user may not have permission to print any part of the document.

The method 200 proceeds to step 206, where the method 200 extracts the security settings from the secure content source. The method 200 extracts passwords, user permissions associated with a certificate, or policy permissions active for all or part of the document. Document expiry settings are also extracted. When security settings exist for only part of the document (i.e., content-specific security settings), the security settings may be specific to a particular content element, such as a particular image, or specific to content types, such as all images, or all text. Hence, if the security settings for a source are for example, specific to a particular image only, if the image is copied, the security settings for the image are extracted. However, if text from the document is copied, no security settings are extracted.

The method 200 proceeds to step 208, where the method 200 may optionally receive user-specified changes to the extracted security settings. The method 200 displays options for the security settings. The options include, but are not limited to, removing all extracted security settings, applying additional security, locking permissions, which prevents a user from overriding security settings, and/or applying security based on a specific destination file format. For example, a user may specify using specific security settings when copying to a WORD or EXCEL document, but removing all security settings when copying to a POWERPOINT® document.

The method 200 proceeds to step 210, where the method 200 encrypts the selected content using the specified source encryption mechanism(s) and user specific authentication information such as a public key certificate or a policy server userID. In the case of a policy server encryption, the method 200 initiates registering a document with the digital rights management module, and acquires license and registration information from the digital rights management module. The resultant is encrypted content.

The method 200 proceeds to step 212, where the method 200 copies the encrypted content onto the clipboard using the security settings extracted from the source document or any user-specified security settings from step 208 above. The method 200 also copies the security settings onto the clipboard, including the encryption mechanism, any user authentication data such as a public key certificate or a policy server userID and any permissions, including document specific information for policy encryption such as an expiry date of the source document, a policyID of a newly created policy, and a licenseID. The method 200 proceeds to step 214 and ends.

Figure 3:
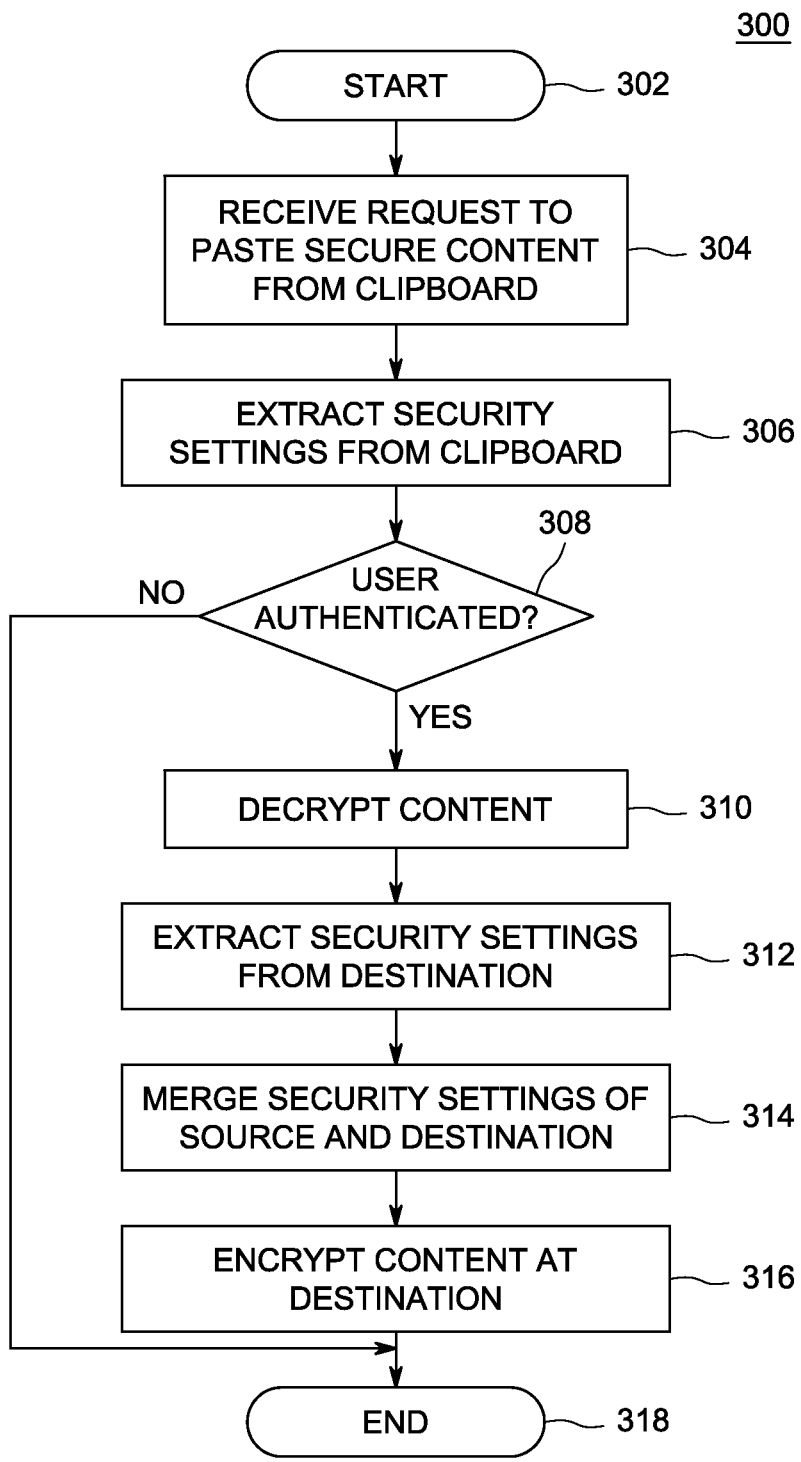
FIG. 3 is a flowchart of a method for retrieving the secure content from a clipboard and pasting the secure content into a destination as performed by, the authentication module and the encryption module of FIG. 1, according to one or more embodiments.

FIG. 3 is a flowchart of a method 300 for retrieving the secure content from a clipboard and pasting the secure content into a destination as performed by, the authentication module 124 and the encryption module 112 of FIG. 1, according to one or more embodiments. The method 300 authenticates a user who attempts to retrieve secured content (i.e., encrypted content) from the clipboard and upon successful authentication decrypts the encrypted content. The method 300 then copies the decrypted content to the destination, encrypted with the merged security settings of the content source as well as the destination.

The method 300 starts at step 302 and proceeds to step 304. At step 304, the method 300 receives a request to paste the secure content from the clipboard. The method 300 proceeds to step 306, where the method 300 extracts the security settings from that clipboard that were stored with the requested secure content. The method 300 proceeds to step 308, where the method 300 determines whether the user requesting the content is authentic. Authentication is dependent upon the security settings used to encrypt the encrypted content (i.e., the security settings extracted from the content source). For example, if the encrypted content is encrypted with a password, a message is displayed to the user, who must enter the password. If the encrypted content is encrypted with policy server permissions, a message is displayed requesting a userID. The userID is used to access a digital rights management database. The userID must be associated with permissions that allow access to the content. Any and all permissions for all encryption methods used to encrypt the content must be verified. If the verification fails for any encryption method, the user is not authenticated and the method 300 proceeds to step 318, where the method 300 ends.

If verification is successful, the user is authorized to retrieve the content and the method 300 proceeds to step 310. At step 310, the method 300 decrypts the encrypted content from the clipboard. The method 300 temporarily stores the security settings for the encrypted content. The method 300 proceeds to step 312, where the method 300 extracts security settings from the destination. The destination may not have any security, or it may be secured using one or more encryption methods, such as password encryption, certificate-based cryptography techniques, policy server encryption, or any encryption mechanism known in the art.

The method 300 proceeds to step 314, where the method 300 merges the security settings of the source and the destination. In some embodiments, the method 300 merges the security settings of the encrypted content with the security settings, if any, of the destination. In some embodiments, if the security settings of the source are different from the security settings of the destination, the more powerful security is used. For example, if the content source uses password encryption with copy permissions, and the destination uses certificate-based encryption with print, copy and edit permissions, the destination content is encrypted with new security settings comprising the certificate-based encryption of the content source with copy permissions. In some embodiments, if the content source and the destination use a same encryption algorithm, particular parts of the destination content may be encrypted with different security settings. For example, if both the content source and the destination use password encryption, wherein the content source has copy permissions, and the destination has print, copy, and edit permissions, the encryption algorithm remains password encryption, however, the content copied from the content source has encryption parameters different from the remaining parts of the destination content. Specifically, the content copied from the content source has copy permissions and the remainder of the content in the destination has print, copy, and edit permissions. In some embodiments, the security settings are selected based on user-input. In some embodiments, the security settings are based on the format of the destination as described previously.

The method 300 proceeds to step 316, where the method 300 encrypts the content at the destination. The method 300 proceeds to step 318 and ends.

Figure 4:
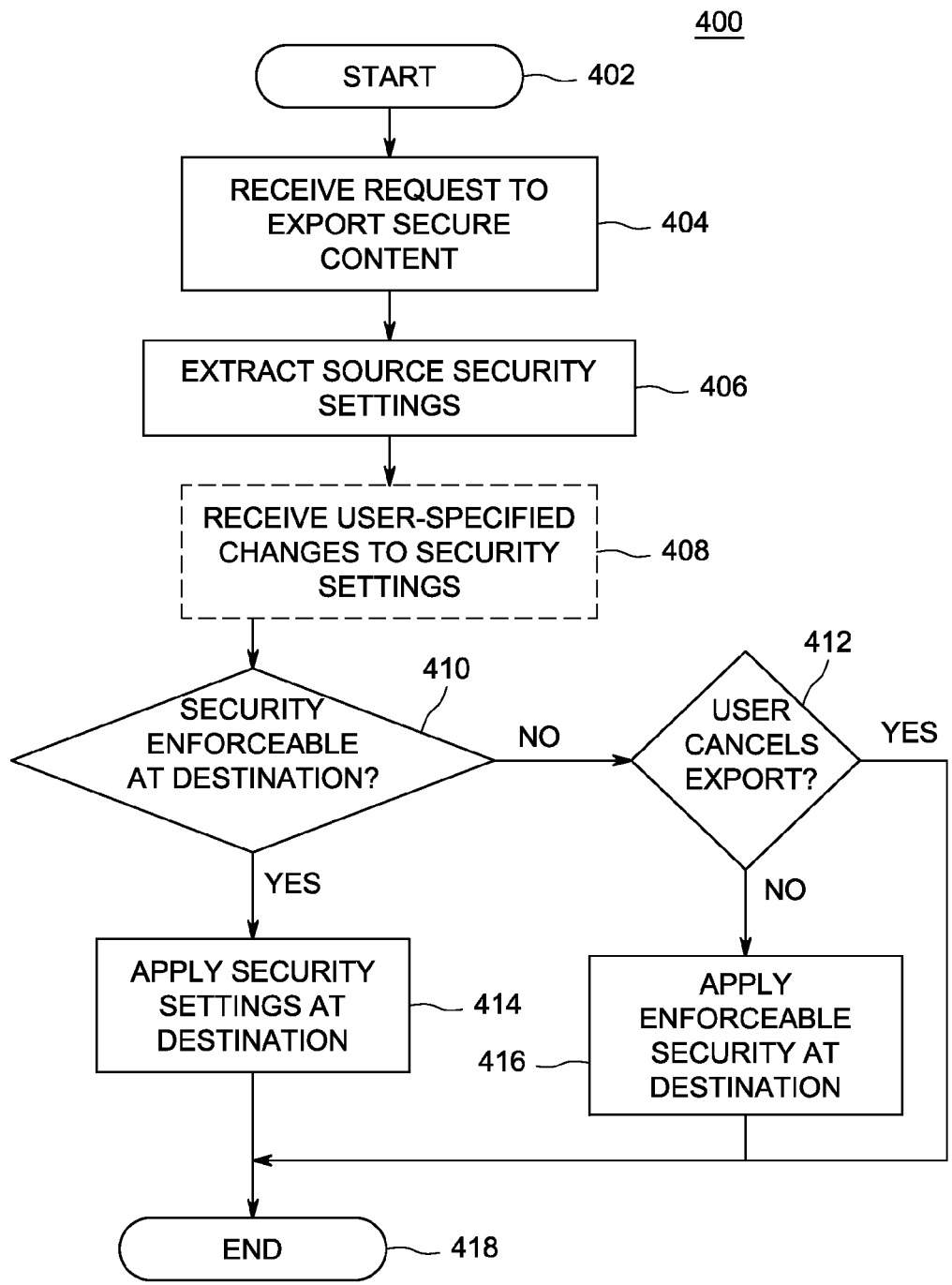
FIG. 4 is a flowchart of a method for extracting selected secure content from a content source as performed by the encryption module of FIG. 1, according to one or more embodiments.

FIG. 4 is a flow diagram of a method 400 for exporting content from a secure source, as performed by the encryption module 112 of FIG. 1, according to one or more embodiments of the invention. The method 400 secures content that is exported to a different format by extracting the security settings from the source, allowing a user to modify the security settings that are to be applied to the destination, and warn a user when the source security setting cannot be enforced.

The method 400 starts at step 402 and proceeds to step 404. At step 404, the method 400 receives a request for part or all of a secured document to be saved as a local copy or when part or all of the secured document is requested to be converted from a current format into a new format. Content from the secured document may be exported as a PDF or WORD document, or may optionally be sent as an email or an email attachment. The method 400 proceeds to step 406, where the method 400 extracts the security settings from the secure source as provided in step 206 of method 200 above.

The method 400 proceeds to step 408, where the method 400 may optionally receive user-specified changes to the extracted security settings. The method 400 displays options for the security settings. The options include, but are not limited to, removing all extracted security settings, applying additional security, locking permissions, which prevents users from overriding security settings, and/or applying security based on a specific destination file format. For example, a user may specify using specific security settings when copying to a WORD or EXCEL document, but removing all security settings when copying to a POWERPOINT® document.

The method 400 proceeds to step 410, where the method 400 determines whether the security settings can be enforced based on the destination format. For example, the source content may be created using ADOBE® InDesign® and comprises a rich layout, typography, and images. The ADOBE® InDesign® may have permissions set to "NoPrint" and "NoEdit". If the export format is text with permissions set to "ALL", it is not possible to impose the source document's security settings (NoPrint, NoEdit) to the destination format. Hence, the extracted security settings would be lost with the export. If the method 400 determines that the security settings are compatible with the destination format, the method 400 proceeds to step 414, where the method 400 applies the security settings to the destination then proceeds to step 418 and ends.

If, however, at step 410, the method 400 determines that some or all of the extracted and/or user-specified security settings cannot be imposed on the destination, the method 400 proceeds to step 412, where the method 400 determines whether the user wishes to continue or cancel the export. The method 400 displays a warning that security settings will be lost. The user may continue or cancel the export action. If the method 400 determines the user wishes to cancel the export, the method 400 proceeds to step 418, where the method 400 ends.

However, if at step 412, the method 400 determines that the user wishes to continue the export, the method 400 proceeds to step 416. At step 416, the method 400 applies the enforceable security setting, if any at the destination. In the event that no security settings are enforceable, the method 400 stores the content at the destination without security settings. The method 400 proceeds to step 418 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
receiving a request to extract selected content from a secure source document;
extracting, one or more security settings associated with at least one of the selected content or the source document;
encrypting the selected content with the one or more extracted security settings;
storing the encrypted content and the one or more extracted security settings, wherein storing includes placing the encrypted selected content on at least one of a computer clipboard or a short-term storage location;
receiving a request to paste the encrypted content to a destination;
decrypting the encrypted content requested;
determining whether the destination comprises security settings;
extracting one or more security settings from the destination when it is determined the destination comprises security settings;
encrypting the requested content, with the one or more security settings of the source document and security settings of the destination, wherein encrypting the requested content includes applying the one or more security settings of the content source and the security setting of the destination to the destination.

2. The method of claim 1, further comprising verifying a user who requested to paste is authorized to access the secure content source from which the requested content was copied.

3. The method of claim 1, wherein the security settings of the source document comprise at least one of a password encryption, a certificate-based encryption, or a digital rights management encryption.

4. The method of claim 1, wherein encrypting the requested content comprises applying the one or more security settings of the content source to the selected content at the destination and one or more security settings of the destination to the remainder of the destination content.

5. An apparatus for securing transfer of secure source content to a destination comprising:
a device comprising a processor and a memory containing instructions executable by the processor, the device being operative to receive and process requests to extract selected content from a secure source document and wherein the instructions executable by the processor comprise a module for:
receiving a request to extract selected content from a secure source document;
extracting, one or more security settings associated with at least one of the selected content or the source document;
encrypting the selected content with the one or more extracted security settings;
storing the encrypted content and the one or more extracted security settings, wherein storing includes placing the encrypted selected content on at least one of a computer clipboard or a short-term storage location;
receiving a request to paste the encrypted content to a destination;
decrypting the encrypted content requested;
determining whether the destination comprises security settings;
extracting one or more security settings from the destination when it is determined the destination comprises security settings; and
encrypting the requested content with the one or more security settings of the source document and security settings of the destination, wherein encrypting the requested content includes applying the one or more security settings of the content source and the security setting of the destination to the destination.

6. The apparatus of claim 5, wherein said memory further contains instructions executable by the processor for verifying a user is authorized to access the secure source document from which secure content was selected.

7. The apparatus of claim 5, wherein the security settings of the source document comprise at least one of a password encryption, a certificate-based encryption, or a digital rights management encryption.

8. The apparatus of claim 5, wherein instructions stored and executable by the processor include instructions for selecting and applying, to one of the destination and destination content, one of:
an encryption technique specified by the one or more security settings extracted from the source document, and
an encryption technique more restrictive than specified by the one or more security settings extracted from the source document and extracted from the destination.

9. A non-transitory computer readable medium for storing computer instructions that, when executed by at least one processor causes the at least one processor to perform a method for securing transfer of secure content to a destination comprising:
receiving, a request to extract selected content from a secure source document;
extracting one or more security settings associated with at least one of the selected content or the source document;
encrypting the selected content according to the one or more extracted security settings; and
storing the encrypted selected content and the one or more extracted security settings, wherein storing includes placing the encrypted selected content on at least one of a computer clipboard or a short-term storage location;

receiving a request to paste the encrypted selected content to a destination;

decrypting the encrypted selected content requested to obtain destination content;

determining whether the destination comprises security settings;

extracting one or more security settings from the destination document when it is determined the destination document comprises security settings; and encrypting the requested content with at least one of the stored extracted security settings of the source content and at least one of the security settings of the destination, wherein encrypting the requested content includes applying the one or more security settings of the content source and the security setting of the destination to the destination.

10. The computer readable medium of claim 9, further comprising verifying a user who requested to paste is authorized to access the secure content source from which the requested content was copied.

11. The computer readable medium of claim 9, wherein the security settings of the source document comprise at least one of a password encryption, a certificate-based encryption, or a digital rights management encryption.

12. The computer readable medium of claim 9, wherein extracted security settings stored with the stored encrypted content and extracted security settings associated with the destination include at least one of print, copy and edit permissions, the method further comprising applying those permissions included in both the one or more security settings of the content source at the destination and the security setting of the destination to the destination.

13. The computer readable medium of claim 9, wherein encrypting the requested content comprises applying the one or more security settings of the content source to the selected content at the destination and one or more security settings of the destination to the remainder of the destination content.

* * * * *